(12) United States Patent
Jacobs et al.

(10) Patent No.: US 9,567,466 B2
(45) Date of Patent: Feb. 14, 2017

(54) ROOFING GRANULE INCLUDING A BASE PARTICLE AND A LAYER COVERING THE BASE PARTICLE, A PROCESS OF FORMING THE SAME, AND A ROOFING PRODUCT INCLUDING THE ROOFING GRANULE

(71) Applicant: CERTAINTEED CORPORATION, Malvern, MA (US)

(72) Inventors: Gregory F. Jacobs, Oreland, PA (US); Husnu M. Kalkanoglu, Swarthmore, PA (US); Ming Liang Shiao, Collegeville, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 83 days.

(21) Appl. No.: 14/023,148

(22) Filed: Sep. 10, 2013

(65) Prior Publication Data

US 2014/0093686 A1     Apr. 3, 2014

Related U.S. Application Data

(60) Provisional application No. 61/701,080, filed on Sep. 14, 2012.

(51) Int. Cl.
*C09D 1/00* (2006.01)
*E04D 7/00* (2006.01)

(52) U.S. Cl.
CPC ............... *C09D 1/00* (2013.01); *E04D 7/005* (2013.01); *Y10T 428/24413* (2015.01); *Y10T 428/2982* (2015.01)

(58) Field of Classification Search
CPC ... C09D 1/00; E04D 7/005; Y10T 428/24355; Y10T 428/24364; Y10T 428/24372; Y10T 428/2438; Y10T 428/24388; Y10T 428/24405; Y10T 428/24413; Y10T 428/24421; Y10T 428/2982; Y10T 428/2991; Y10T 428/2993; Y10T 428/2995; Y10T 428/2998

(Continued)

(56) References Cited

U.S. PATENT DOCUMENTS 2,718,479 A * 9/1955 Bierly ........................ 428/445
3,479,201 A * 11/1969 Sloan ........................ 428/145

(Continued)

OTHER PUBLICATIONS

U.S. Appl. No. 14/023,151, filed Sep. 10, 2013, Inventors: Ming Liang Shiao et al.

(Continued)

*Primary Examiner* — Nathan Van Sell
(74) *Attorney, Agent, or Firm* — Abel Law Group, LLP; Alexander H Plache (57) ABSTRACT

A roofing granule can include a material including a transition metal carbonate; a mixed metal carbonate, wherein at least one metal within the mixed metal carbonate includes a transition metal; a first metal carbonate and a second metal compound, wherein the first and second metals are different metal elements; a third metal carbonate and silica; or any combination thereof. A process of forming a roofing granule can include providing a base particle having pores, and infiltrating a fluid into the pores of the base particle, wherein the fluid includes a carbonate. The process can further include reacting the carbonate with a metal compound within the base particle to form a metal carbonate, wherein the roofing granule comprises a material that includes the metal carbonate.

10 Claims, 2 Drawing Sheets

(58) Field of Classification Search
USPC .................. 428/141–150, 402, 403–407
See application file for complete search history.

(56) References Cited

U.S. PATENT DOCUMENTS

| | | |
|---|---|---|
| 5,116,790 A | 5/1992 | Bruno et al. |
| 5,298,654 A | 3/1994 | DeGuire et al. |
| 7,351,462 B2 | 4/2008 | Friedman et al. |
| 7,811,630 B2 | 10/2010 | Hong et al. |
| 8,114,367 B2 | 2/2012 | Riman et al. |
| 2006/0251807 A1 | 11/2006 | Hong et al. |
| 2008/0026183 A1 | 1/2008 | Vanpulle et al. |
| 2009/0142578 A1 | 6/2009 | Riman et al. |
| 2009/0143211 A1 | 6/2009 | Riman et al. |
| 2011/0044876 A1 | 2/2011 | Riman et al. |
| 2011/0052874 A1 | 3/2011 | Zhou et al. |
| 2011/0086201 A1 | 4/2011 | Shiao et al. |
| 2011/0104469 A1 | 5/2011 | Riman et al. |
| 2011/0129407 A1 | 6/2011 | Riman et al. |
| 2011/0158873 A1* | 6/2011 | Riman et al. ............ 423/228 |
| 2011/0182799 A1* | 7/2011 | Riman et al. ............ 423/396 |

OTHER PUBLICATIONS

Riman, et al. Hydrothermal crystallization of ceramics in Ann. Chim. Sci. Mat., 2002, 27 (6), pp. 15-36.

* cited by examiner

ROOFING GRANULE INCLUDING A BASE PARTICLE AND A LAYER COVERING THE BASE PARTICLE, A PROCESS OF FORMING THE SAME, AND A ROOFING PRODUCT INCLUDING THE ROOFING GRANULE

This application claims priority to and benefit of U.S. Provisional Patent Application No. 61/701,080, filed Sep. 14, 2012, which is incorporated herein by reference in its entirety.

FIELD OF THE DISCLOSURE

The present disclosure relates to roofing granules, roofing products, and methods of forming roofing granules, and more particularly to, roofing granules including base particles and layers covering the base particles, and roofing products including such roofing granules.

RELATED ART

Roofing granules can help to retain the integrity of the roofing products during exposure to an outdoor environment. Specifically, granules can protect and preserve the roofing product from solar ultraviolet radiation. Roofing granules serve other purposes in roofing products. Roofing granules can give roofing products their aesthetic appeal. Roofing granules can include base particles that are covered with metal silicates that provide for a variety of different colors for the roofing products. Further improvements in roofing granules and processes of forming roofing granules are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. The term "averaged" is intended to refer to an average, a median, or a geometric mean.

When referring to a particle size distribution, "D" followed by a number refers to percentile of the distribution that is less than a particular size. For example, D10 of 1 micron means that 10% of the particles have a particle size 1 micron or smaller. As used herein, average diameter is used as the basis for the particle size.

Except for atmospheric pressure, all pressures described herein are gauge pressures unless explicitly stated otherwise.

The term "rare earth," within respect to the elements of the Period Table of the Elements, is intended to mean Sc, Y, La, and the lanthanide series.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

A roofing granule can include a material including a transition metal carbonate; a mixed metal carbonate, wherein at least one metal within the mixed metal carbonate includes a transition metal; a first metal carbonate and a second metal compound, wherein the first and second metals are different metal elements; a third metal carbonate and silica; or any combination thereof. When forming the roofing granule, a base particle having pores can be infiltrated with a fluid that enters into the pores of the base particle, wherein the fluid includes a carbonate. The process also can include reacting the carbonate with a metal compound within the base particle to form a metal carbonate, wherein the roofing granule comprises a material that includes the metal carbonate. The roofing granule can be used in roofing products, such as roofing shingles.

The roofing granule may be formed by a green process, that is, one in which atmospheric $CO_2$ or another greenhouse gas can be captured to form carbonic acid or a carbonate form, and thus, the process can be used to reduce $CO_2$ in the atmosphere and form a stable metal carbonate that is not readily converted back to $CO_2$ in normal use of the roofing granule.

Exemplary processes and products are illustrated in the figures and described below. The particular embodiments are merely illustrative and are not intended to limit the scope of the claims. After reading the specification, skilled artisans will appreciate that other embodiments not described herein can be used without departing from the scope of the invention.

Figure 1:
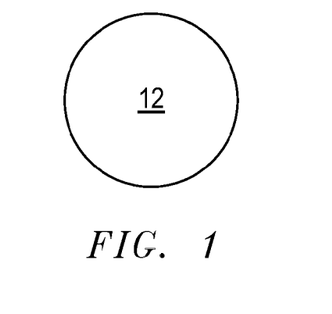
FIG. 1 includes an illustration of a cross-sectional view of a base particle.

FIG. 1 includes an illustration of a cross-sectional view of a base particle 12 that is used to form a roofing granule. A material within the base particle 12 can react with a carbonate to form a metal carbonate. The base particle 12 may include a matrix and corresponding pores. Exemplary materials for the base particle 12 can include a metal oxide, a metal hydroxide, a metal sulfate, a metal silicate, a metal halide, another suitable metal compound, or any combination thereof. Each of the metal compounds can be a single metal element compound or a mixed-metal compound.

An exemplary metal oxide can include beryllium (for example, BeO), magnesium (for example, MgO), calcium (for example, CaO or $CaO_2$), strontium (for example, SrO), barium (for example, BaO), scandium (for example, $Sc_2O_3$), yttrium (for example, $Y_2O_3$), lanthanum (for example, $La_2O_3$), neodymium (for example, $Nd_2O_3$), any of the other lanthanide series oxides, thallium (for example, $ThO_2$, $Th_2O_3$), any of the other actinide series oxides, titanium (for example, TiO, $TiO_2$, or $Ti_2O_3$), zirconium (for example, $ZrO_2$), hafnium (for example, $HfO_2$), vanadium (for example, VO, $V_2O_3$, $VO_2$, or $V_2O_5$), niobium (for example, $NbO_2$ or $Nb_2O_5$), tantalum (for example, $TaO_2$ or $Ta_2O_5$), chromium (for example, CrO, $Cr_2O_3$, $CrO_3$, or $CrO_2$), molybdenum (for example, $MoO_2$, $Mo_2O_5$, $Mo_2O_3$ or $MoO_3$), tungsten (for example, $WO_2$ or $W_2O_5$), manganese (for example, MnO, $Mn_2O_3$, $MnO_2$, or $Mn_2O_7$), technetium (for example, $Tc_2O$ or $Tc_2O_3$), rhenium (for example, $ReO_2$ or $Re_2O_3$), iron (for example, FeO or $Fe_2O_3$), cobalt (for example, CoO, $Co_2O_3$, or $Co_3O_4$), nickel (for example, NiO or $Ni_2O_3$), ruthenium (for example, $RuO_2$ or $RuO_4$), rhodium (for example, $RhO_2$ or $Rh_2O_3$), palladium (for example, PdO or $PdO_2$), osmium (for example, OsO or $OsO_2$), iridium (for example, $IrO_2$ or $IR_2O_3$), platinum (for example, PtO, $PtO_2$, $PtO_3$, $Pt_2O_3$, or $Pt_3O_4$), copper (for example, CuO, $Cu_2O$), silver (for example, $Ag_2O$), gold (for example, $Au_2O_3$ or $Au_2O$), zinc (for example, ZnO), cadmium (for example, CdO), mercury (for example, HgO or $Hg_2O$), aluminum (for example, $Al_2O_3$), gallium (for example, $Ga_2O_3$ or $Ga_2O$), indium (for example, $In_2O_3$), germanium (for example, GeO, $GeO_2$), tin (for example, SnO, $SnO_2$), lead (for example, PbO, $PbO_2$, $Pb_3O_4$, $Pb_2O_3$, or $Pb_2O$), antimony (for example, $Sb_2O_3$ or $Sb_2O_5$), bismuth (for example, $Bi_2O_3$, $Bi_2O_5$, $Bi_2O_4$, $Bi_2O_3$, or BiO), a magnesium titanate (for example, $MgTiO_3$), a calcium titanate (for example, $CaTiO_3$,), a strontium titanate (for example, $SrTiO_3$), a barium titanate (for example, $BaTiO_3$), a doped or partially substituted oxide (for example, $Ca_xSr_{(1-x)}TiO_3$ or $BaTi_yLa_{(1-y)}O_3$), another suitable metal oxide capable of forming a metal carbonate or any combination thereof.

In another embodiment, the metal hydroxide can include a magnesium hydroxide (for example, $Mg(OH)_2$), a calcium hydroxide (for example, $Ca(OH)_2$), a strontium hydroxide (for example, $Sr(OH)_2$), a barium hydroxide (for example, $Ba(OH)_2$), a titanium hydroxide (for example, $Ti(OH)_2$), a zirconium hydroxide (for example, $Zr(OH)_4$), a chromium hydroxide (for example, $Cr(OH)_2$), a manganese hydroxide (for example, $Mn(OH)_2$), an iron hydroxide (for example, $Fe(OH)_2$), a copper hydroxide (for example, $Cu(OH)_2$), a zinc hydroxide (for example, $Zn(OH)_2$), an aluminum hydroxide (for example, $Al(OH)_3$), or any combination thereof.

The metal sulfate can include $MgSO_4$, $CaSO_4$, $SrSO_4$, $BaSO_4$, a titanium sulfate (for example, $TiSO_4$ or $Ti_2(SO_4)_3$), $ZrSO_4$), a chromium sulfate (for example, $Cr_2(SO_4)_3$), a manganese sulfate (for example, $MnSO_4$), an iron sulfate (for example, $FeSO_4$), a nickel sulfate (for example, $NiSO_4$), a copper sulfate (for example, $CuSO_4$), $ZnSO_4$), $Al_2(SO_4)_3$), another suitable metal sulfate capable of forming a metal carbonate, or any combination thereof.

The metal silicate can include a lithium metasilicate, a lithium orthosilicate, a sodium metasilicate, a beryllium silicate, a calcium silicate, a strontium orthosilicate, a barium metasilicate, a zirconium silicate, a manganese metasilicate, an iron silicate, a cobalt orthosilicate, a zinc orthosilicate, a cadmium metasilicate, a mullite, a rare earth oxyorthosilicate, a rare earth pyrosilicate, andalusite, sillimanite, hyanite, kaolinite, or any combination thereof.

The metal halide can be a metal fluoride including $MgF_2$, $CaF_2$, $SrF_2$, $BaF_2$, a titanium fluoride (for example, $TiF_3$), a zirconium fluoride (for example, $ZrF_4$), a chromium fluoride (for example, $CrF_2$), a manganese fluoride (for example, $MnF_2$), an iron fluoride (for example, $FeF_2$), a copper fluoride (for example, $CuF_2$), a nickel fluoride (for example, $NiF_2$), $ZnF_2$, $AlF_3$), a mixed-metal halide (for example, $La_xCe_{(1-x)}Br_3$ or $Lu_yCe_{(1-y)}Cl_3$), another suitable metal halide capable of reacting to form a metal carbonate, or any combination thereof. Alternatively, the anion of the metal salts may come, for example, from the following groups: hydroxides, nitrates, chlorides, acetates, formates, propionates, phenylacetates, benzoates, hydroxybenzoates, aminobenzoates, methoxybenzoates, nitrobenzoates, sulfates, fluorides, bromides, iodides, carbonates, oxalate, phosphate, citrate, and silicates, or mixtures thereof.

Further, the base particle 12 can include pigments, colorants, antimicrobials, photocatalysts or other components to modify the appearance and aesthetics of the base particle 12 or its functionality. In an embodiment, the base particle 12 can include an organic colorant, such as an organic pigment or an organic dye.

In an embodiment, the base particle 12 can include a low density filler material or void containing filler material to moderate the density of the roofing granule being formed. Examples of such materials can include hollow glass microspheres, hollow ceramic microspheres, polymer microspheres, expanded perlite, volcanic ash, pumice, another suitable material, or any combination thereof. Such materials may or may not participate in the carbonation reaction described herein.

In an embodiment, the base particle 12 has a D10 particle size of at least approximately 0.001 microns, at least approximately 0.015 microns, at least approximately 0.11 microns, or at least approximately 1 microns, and in another embodiment, the D10 particle size is no greater than approximately 30 microns, no greater than approximately 8 microns, no greater than approximately 0.2 microns, or no greater than approximately 0.01 microns. In an embodiment, the material of the base particle 12 has a D50 particle size of at least approximately 0.1 microns, at least approximately 0.8 microns, at least approximately 1.3 microns, or at least approximately 2 microns, and in another embodiment, the D50 particle size is no greater than approximately 90 microns, no greater than approximately 21 microns, no greater than approximately 7 microns, or no greater than approximately 0.7 microns. In a further embodiment, the material of the base particle 12 has a D90 particle size of at least approximately 0.7 microns, at least approximately 1 micron, at least approximately 7 microns, or at least approximately 20 microns, and in another embodiment, the D90 particle size is no greater than approximately 220 microns, no greater than approximately 110 microns, no greater than approximately 30 microns, or no greater than approximately 17 microns.

In another embodiment, the base particle 12 has an open porosity that is at least approximately 3%, at least approximately 7%, at least approximately 10%, or at least approximately 12%, at least approximately 17%, or at least approximately 25%, and in another embodiment, the base particle 12 has an open porosity no greater than approximately 30%, no greater than approximately 25%, no greater than approximately 15%, no greater than approximately 12%, no greater than approximately 10%, or no greater than approximately 8%. In another embodiment, the base particle 12 has a pore size that is at least about 0.01 microns, at least about 0.1 microns, or at least about 0.5 microns, and in another embodiment, no greater than about 100 microns, no greater than about 20 microns, or no greater than about 1 micron.

The process can continue with infiltrating a fluid into the pores of the base particle 12. Pores within the base particle 12 can allow the fluid to provide a reactant to a material within the base particle 12. The reactant can be a carbonate of Na, K, Rb, Cs, Be, Mg, Ca, Sr, Ba, Sc, Y, La, Nd, Yb, or another lanthanide series element, Th or another actinide series element, Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Hg, Al, Ga, Ge, Sn, Pb, Sb, or any mixture thereof. In a further embodiment, the carbonate can be supplied as a carbonic acid.

The fluid may be a liquid or a gas. Skilled artisans may find use of a liquid, at the subsequent reaction conditions, to be particularly advantageous. In an embodiment, the liquid can include water, ammonia, an organic compound, another suitable medium for providing a reactant to the material of the base particle 12, or any combination thereof. The organic compound can include an alcohol (for example, $C_xH_{(2x+1)}OH$, wherein x is 1, 2, or 3); a polyol (for example, $C_xH_{2x}(OH)_2$, wherein x is 1, 2, or 3); a heteroaromatic (for example, a furan, a thiophene, a pyrrole, or a pyridine); an amine (for example, $CH_3(CH_2)_nNH_2$, wherein n is 0, 1, or 2)); an ether, an ester, or a ketone having no more than 6 carbon atoms (for example, diethyl ether or acetone); a sulfoxide (for example, dimethylsulfoxide); an acetonitrile; another suitable organic compound; or any combination thereof. When an organic compound is used, skilled artisans may find such compounds that are relatively soluble in water to be particularly advantageous. In the organic compounds listed above, one or more H atoms may be substituted with one or more halides.

The pH of the fluid may be adjusted using an acid or a base. The acid can include an inorganic acid (for example, $H_2SO_4$, HCl, or $HNO_3$) or an organic acid (for example, citric acid, acetic acid, or oxalic acid). The pH of the fluid can be greater than 7, 8, 9, 19, 11, or 12. The base can include an inorganic base (for example, NaOH, KOH, or $NH_4OH$) or an organic base (for example, $CH_3(CH_2)_nNH_2$ or $((CH_3(CH_2)_n)_xNH_{(4-x)}OH$, wherein n is 0, 1, or 2, and x is 1, 2, 3, or 4). For the organic acids and bases, one or more H atoms may be substituted with a halide. In a further embodiment, a surfactant, a buffer, a corrosion inhibitor, or another suitable compound may be used to achieve a desired characteristic or reduce an adverse effect, or any combination thereof can be used.

Figure 2:
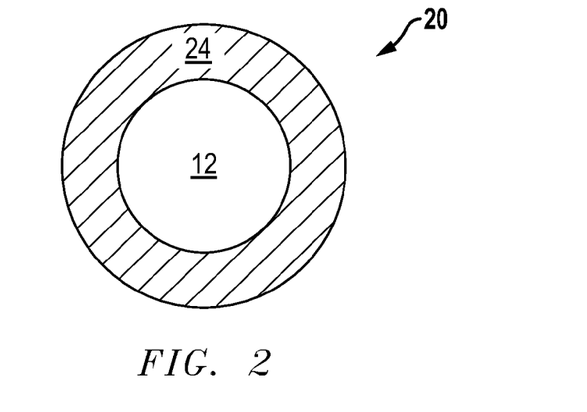
FIG. 2 includes an illustration of a cross-sectional view of a roofing granule after reacting a portion of the base particle to form layer over the base particle in accordance with an embodiment.

The process can further include reacting the carbonate with a material within the base particle 12 to form a carbonate compound within a layer 24, as illustrated in FIG. 2. In an embodiment, the material is a metal compound, and the reaction forms a metal carbonate.

The processing conditions for the reaction may take place at a variety of pressures, temperatures and time periods. In an embodiment, the reaction is performed at a pressure of at least approximately 5 kPa, at least approximately 11 kPa, at least approximately 50 kPa, at least approximately 110 kPa, at least approximately 500 kPa, at least approximately 1.1 MPa, at least approximately 5 MPa, at least approximately 11 MPa, or at least approximately 50 MPa. In another embodiment, the reaction is performed at a pressure no greater than approximately 900 MPa, no greater than approximately 500 MPa, no greater than least approximately 90 MPa, or no greater than approximately 50 MPa, no greater than approximately 900 kPa, no greater than approximately 500 kPa, no greater than approximately 90 kPa, or no greater than approximately 50 kPa. In one embodiment, the reaction is performed at substantially ambient pressure.

In an embodiment, the reaction is performed at a temperature of at least approximately 20° C., at least approximately 50° C., at least approximately 80° C., at least approximately 110° C., at least approximately 150° C., at least approximately 200° C., at least approximately 250° C., or at least approximately 300° C. In another embodiment, the reaction is performed at a temperature no greater than approximately 1000° C., no greater than approximately 500° C., no greater than approximately 300° C., no greater than approximately 250° C., no greater than approximately 190° C., no greater than approximately 150° C., no greater than approximately 130° C., no greater than approximately 100° C., or no greater than approximately 90° C. In one embodiment, the reaction is performed at substantially ambient temperature.

In an embodiment, the reaction is performed for a time period of at least approximately 11 seconds, at least approximately 1.1 minutes, at least approximately 5 minutes, at least approximately 11 minutes, at least approximately 20 minutes, at least approximately 1 hour, at least approximately 11 hours, at least approximately 20 hours, at least approximately 50 hours. In another embodiment, the reaction is performed for a time period no greater than approximately 200 hours, no greater than approximately 90 hours, no greater than approximately 24 hours, no greater than approximately 5 hours, no greater than approximately 3 hours, no greater than approximately 2 hours, no greater than approximately 0.9 hour, or no greater than approximately 0.5 hour.

The reaction may be performed in an autoclave, a pressure pot, or another suitable apparatus capable of achieving the needed or desired processing conditions. After the reaction is completed, a roofing granule 20 in FIG. 2 is formed. The roofing granule 20 includes the base particle 12 and the layer 24. In one embodiment (not illustrated), substantially all of the base particle 12 is reacted to form the layer 24.

The material can extend a distance from the exposed surface of the roofing granule towards a center of the roofing granule. In an embodiment, the distance extends partly, but not completely to a center of the roofing granule. In a particular embodiment, the material occupies at least approximately 10%, at least approximately 20%, at least approximately 30%, at least approximately 40%, at least approximately 50%, at least approximately 60%, at least approximately 70%, at least approximately 80%, or at least approximately 90% of a volume of the roofing granule. In another particular embodiment, the distance extends at least approximately 0.011 mm, at least approximately 0.05 mm, at least approximately 0.11 mm, at least approximately 0.5 mm, or at least approximately 1.1 mm of the distance from the exposed surface of the roofing granule.

While many materials, infiltrating fluids, reactant compounds, and processing conditions have been described, after reading this specification, skilled artisans will be able to determine one or more particular materials, infiltrating fluids, reactant compounds, and processing conditions that are particularly well suited for an application. A metal oxide can react with an infiltrating fluid including carbonic acid to form a metal carbonate. In an illustrative example:

$$CaO+H_2CO_3 \rightarrow CaCO_3+H_2O$$

Alternatively, the material within the base particle 12 can include a Group 2 or transition metal oxide, and the infiltrating solution can include a Group 1 metal carbonate that is dissolved in water or another aqueous solution. The carbonate anion can react with the Group 2 or transition metal oxide to form a Group 2 or transition metal carbonate. The reaction may be performed in a base to help hydrolyze the Group 2 or transition metal oxide before reacting with the carbonate anions. In a particular illustrative example:

$$CaO+2KOH \rightarrow Ca(OH)_2+K_2O$$

$$Ca(OH)_2+K_2CO_3 \rightarrow CaCO_3+2KOH$$

Thus, the overall reaction is:

$$CaO+K_2CO_3 \rightarrow CaCO_3+K_2O$$

In a further illustrative example:

$$CaSO_4+Na_2CO_3 \rightarrow CaCO_3+Na_2SO_4$$

After reading this specification, skilled artisans will appreciate that many other reactions may be used. $CaCO_3$ is present in many building materials and is extensively characterized. Thus, the formation of $CaCO_3$ may be desired. In other applications, other materials may be desired, and therefore, the formation of $CaCO_3$ is not to be construed as limiting the scope of the present invention.

Analogous carbonates can also be employed using barium or magnesium salts or other divalent metal cation salts to yield, for example, barium or magnesium carbonates. Alternatively, mixtures of cation metals may be included to produce mixed metal carbonates comprising one or more of calcium, magnesium, or barium, copper, iron, manganese, nickel, silver, or zinc. In certain embodiments, the solubility of the metal carbonate in water at 20° C. is less than about 0.05, less than about 0.004, less than about 0.001, or less than about 0.0008 grams per 100 grams of water.

The reaction can change the characteristics of the layer 24 as compared to the unreacted base particle 12. Such characteristics can include open porosity, particle size, density, specific gravity, or change in volume occupied when forming the roofing granule.

The open porosity of the layer 24 may less than the open porosity of the unreacted base particle 12. In an embodiment, the open porosity of the layer 24 is no greater than approximately 99%, no greater than approximately 95%, no greater than approximately 90%, no greater than approximately 80%, or no greater than approximately 70% of the open porosity of the unreacted base particle 12. In another embodiment, the layer 24 has an open porosity of at least approximately 2%, at least approximately 7%, at least approximately 10%, at least approximately 12%, at least approximately 17%, or at least approximately 25%, and in another embodiment, the layer 24 has an open porosity no greater than approximately 30%, no greater than approximately 23%, no greater than approximately 15%, no greater than approximately 12%, no greater than approximately 10%, or no greater than approximately 8%.

In an embodiment, a ratio of the volume of the unreacted portion of the base particle 12 to the volume of the layer 24 is at least approximately 1.1:1, at least approximately 1.5:1, at least approximately 2:1, at least approximately 3:1, at least approximately 5:1, at least approximately 9:1, at least approximately 14:1, or at least approximately 20:1. In a further embodiment, most or all of the base particle 12 can be consumed by the reaction. Thus, the ratio of the volume of the base particle 12 to the volume of the layer 24 is at no greater than approximately 1:1.1, at least approximately 1:1.5, no greater than approximately 1:2, no greater than approximately 1:3, no greater than approximately 1:5, no greater than approximately 1:9, no greater than approximately 1:14, or no greater than approximately 1:20.

In an embodiment, before reacting, the base particle 12 occupies a pre-reaction volume, and after reacting, the roofing granule occupies a post reaction volume. The post-reaction volume is within approximately 30%, within approximately 20%, within approximately 15%, within approximately 9%, within approximately 5%, or within approximately 2% of the pre-reaction volume. In another embodiment, the layer 24 occupies at least approximately 10%, at least approximately 20%, at least approximately 30%, at least approximately 40%, at least approximately 50%, at least approximately 60%, at least approximately 70%, at least approximately 80%, or at least approximately 90% of a volume of the roofing granule.

The averaged particle size of a material within the layer 24 may be changed as compared to the corresponding unreacted material from the base particle 12. In an embodiment, the material within the layer 24 has a D10 averaged particle size that is at least approximately 0.001 microns, at least approximately 0.015 microns, at least approximately 0.11 microns, or at least approximately 1 micron, and in another embodiment, the D10 averaged particle size no greater than approximately 30 microns, no greater than approximately 8 microns, no greater than approximately 0.2 microns, or no greater than approximately 0.01 microns. In an embodiment, the material within the layer 24 has a D50 averaged particle size that is at least approximately 0.1 microns, at least approximately 0.8 microns, at least approximately 1.3 microns, or at least approximately 2 microns, and in another embodiment, the D50 averaged particle size no greater than approximately 90 microns, no greater than approximately 21 microns, no greater than approximately 7 microns, or no greater than approximately 0.7 microns. In an embodiment, the material within the layer 24 has a D90 averaged particle size that is at least approximately 0.7 microns, at least approximately 1 micron, at least approximately 7 microns, or at least approximately 20 microns, and in another embodiment, the D90 averaged particle size no greater than approximately 220 microns, no greater than approximately 110 microns, no greater than approximately 30 microns, or no greater than approximately 17 microns.

A volume occupied by the roofing granule before the reaction (that is, the volume occupied by the base particle 12 for the embodiment illustrated in FIG. 1), also referred to as the pre-reaction volume, is substantially the same as the volume occupied by the roofing granule 20 after the reaction (that is, the volume occupied by a combination of the base particle 12 and the layer 24 for the embodiment illustrated in FIG. 2), also referred to as the post-reaction volume. In actual practice, the volume may change such that the post-reaction volume is greater than or less than the pre-reaction volume. In an embodiment, the post-reaction volume of the roofing granule 20 is within approximately 30%, within approximately 20%, within approximately 15%, within approximately 9%, within approximately 5%, or within approximately 2% of the pre-reaction volume of the base particle 12. In another embodiment, the layer 24 occupies at least approximately 10%, at least approximately 20%, at least approximately 30%, at least approximately 40%, at least approximately 50%, at least approximately 60%, at least approximately 70%, at least approximately 80%, or at least approximately 90% of a volume of the roofing granule.

The unreacted base particle 12 can have a density less as compared to the layer 24, and therefore, the mass of the roofing granule 20 can be reduced by not reacting all of the base particle 12. In an embodiment, no more than approximately 50%, no more than approximately 40%, no more than approximately 30%, no more than approximately 20%, or no more than approximately 9% of the base particle 12 is reacted.

In another application, more of the base particle 12 may need to be reacted. In an embodiment, at least approximately 50%, at least approximately 70%, at least approximately 80%, at least approximately 90%, or at least approximately 95% of the base particle 12 is reacted. In a particular embodiment, at least approximately 99% or substantially all of the base particle 12 is reacted.

The base particle 12 may include an antimicrobial agent as originally formed, or the reaction with the base particle 12 can produce an antimicrobial agent. In a particular embodiment, the antimicrobial agent comprises a photocatalytic antimicrobial agent adjacent to a surface of the base particle 12. In a further embodiment, the reaction produces $Cu_2O$, $Ag_2O$, $SnO_2$, $ZnO$, $TiO_2$, or any combination thereof.

Figure 3:
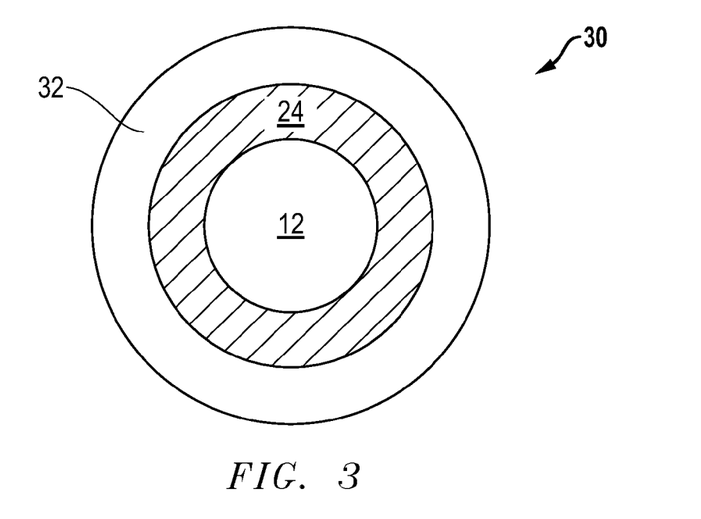
FIG. 3 includes an illustration of a cross-sectional view of a roofing granule in accordance with a further embodiment.

In another embodiment, a coating 32 may be formed over the layer 24 as illustrated in FIG. 3, if needed or desired. In an embodiment, the coating 32 can be a conventional coating used to cover base particles of conventional roofing granules. In another embodiment, another layer can be formed over the layer 24 and the other layer may be reacted in a manner similar to the base particle 12. Details on such a process can be found in U.S. Application No. 61/701,085 filed on Sep. 14, 2012 and U.S. applications claiming the benefit therefrom U.S application Ser. No. 14/023,151 filed on Sep. 10, 2013), which are incorporated herein in its entirety.

Figure 4:
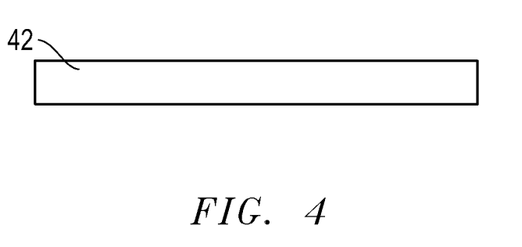
FIG. 4 includes an illustration of a substrate used for a roofing product.
Figure 5:
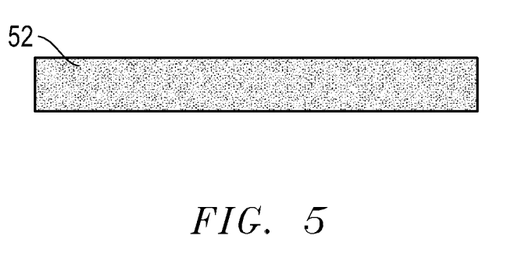
FIG. 5 includes an illustration of the substrate of FIG. 4 after the substrate has been coated with a bituminous material.
Figure 6:
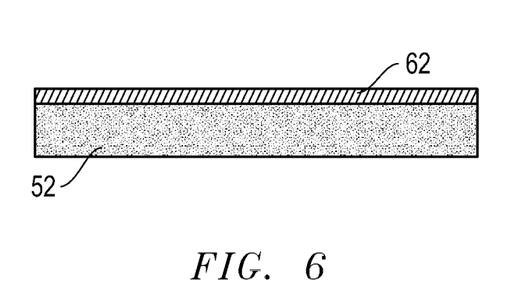
FIG. 6 includes an illustration of the substrate of FIG. 5 after applying roofing granules along an exposed surface of the substrate.

A roofing product can be formed using any of the previously described roofing granules made by any of the previously described processes. FIG. 4 includes an illustration of a cross-sectional view of a substrate 42 for the roofing product. The roofing product can include a shingle, a membrane, or the like. The substrate 42 can include a fiberglass mat, wood, cellulose, polyester, or another suitable substrate used for a roofing product. The substrate 42 is coated with a bituminous material to form the coated substrate 52, as illustrated in FIG. 5. The bituminous material can include asphalt, coal tar, a recycled roofing material, a synthetic bituminous material, or any combination thereof. If needed or desired, an additional coating of any of the foregoing bituminous materials may be applied to the coated substrate 52. Referring to FIG. 6, roofing granules 62 are applied to the coated substrate 52. The roofing granules 62 can be any of the previously described roofing granules, and are applied to the coated substrate 52 using a conventional technique. If another coating of bituminous material was applied the coated substrate 52, the roofing granules 62 are applied after the last layer of bituminous material is coated onto the coated substrate 52. Further processing may be performed if needed or desired. For example, a parting agent or release sheet (not illustrated) may be applied to the side of the roofing product opposite the roofing granules 62. In another embodiment, another sheet of roofing material may be laminated to the roofing product previously described to form a laminated roofing product. In another embodiment, a metallic sheet can be used as a substrate for a roofing product. An adhesive film or coating may be applied to the metallic sheet, and the roofing granules 62 can be applied to the adhesive film or coating. After reading the specification, skilled artisans will be able to form roofing products for their specific applications.

The formation of roofing granules as described herein can help reduce atmospheric $CO_2$ or another greenhouse gas by capturing such gas to form carbonic acid or a carbonate compound. The carbonic acid or carbonate compound can react with a metal to form a stable metal carbonate that is not readily converted back to $CO_2$ in normal use of the building process. Thus, the process can be used to reduce $CO_2$ in the atmosphere and still form a useful the roofing granule. The application of the roofing granules onto roofing products may not change or may be only slightly modified.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below. Embodiments may be in accordance with any one or more of the items as listed below.

Item 1. A roofing granule including a material including a transition metal carbonate; a mixed metal carbonate, wherein at least one metal within the mixed metal carbonate includes a transition metal; a first metal carbonate and a second metal compound, wherein the first and second metals are different metal elements; a third metal carbonate and silica; or any combination thereof.

Item 2. The roofing granule of Item 1, wherein the material has a D10 particle size of at least approximately 0.001 microns, at least approximately 0.015 microns, at least approximately 0.11 microns, or at least approximately 1 micron.

Item 3. The roofing granule of Item 1, wherein the material has a D10 particle size no greater than approximately 30 microns, no greater than approximately 8 microns, no greater than approximately 0.2 microns, or no greater than approximately 0.01 microns.

Item 4. The roofing granule of Item 1, wherein the material has a D50 particle size of at least approximately 0.1 microns, at least approximately 0.8 microns, at least approximately 1.3 microns, or at least approximately 2 microns.

Item 5. The roofing granule of Item 1, wherein the material has a D50 particle size no greater than approximately 90 microns, no greater than approximately 21 microns, no greater than approximately 7 microns, or no greater than approximately 0.7 microns.

Item 6. The roofing granule of Item 1, wherein the material has a D90 particle size of at least approximately 0.7 microns, at least approximately 1 micron, at least approximately 7 microns, or at least approximately 20 microns.

Item 7. The roofing granule of Item 1, wherein the material has a D90 particle size no greater than approximately 220 microns, no greater than approximately 110 microns, no greater than approximately 30 microns, or no greater than approximately 17 microns.

Item 8. The roofing granule of Item 1, the material has an open porosity of at least approximately 3%, at least approximately 7%, at least approximately 10%, at least approximately 12%, at least approximately 17%, or at least approximately 25%.

Item 9. The roofing granule of Item 1, the material has an open porosity no greater than approximately 30%, no greater than approximately 23%, no greater than approximately 15%, no greater than approximately 12%, no greater than approximately 10%, or no greater than approximately 8%.

Item 10. The roofing granule of Item 1, wherein the material further includes an antimicrobial agent.

Item 11. The roofing granule of Item 1, wherein the antimicrobial agent includes a photocatalytic antimicrobial agent adjacent to the exposed surface of the substrate.

Item 12. The roofing granule of Item 1, wherein the material further includes $Cu_2O$, $Ag_2O$, $SnO_2$, ZnO, $TiO_2$, or any combination thereof.

Item 13. The roofing granule of Item 1, wherein the roofing granule further includes a base particle, wherein at least a portion of the material is disposed between a remaining portion of the base particle and the exposed surface of the roofing granule; and the material and base particle include a same metal element.

Item 14. The roofing granule of Item 13, wherein the base particle has a D10 particle size of at least approximately 0.001 microns, at least approximately 0.015 microns, at least approximately 0.11 microns, or at least approximately 1 micron.

Item 15. The roofing granule of Item 13, wherein the base particle has a D10 particle size no greater than approximately 30 microns, no greater than approximately 8 microns, no greater than approximately 0.2 microns, or no greater than approximately 0.01 microns.

Item 16. The roofing granule of Item 13, wherein the base particle has a D50 particle size of at least approximately 0.1 microns, at least approximately 0.8 microns, at least approximately 1.3 microns, or at least approximately 2 microns.

Item 17. The roofing granule of Item 13, wherein the base particle has a D50 particle size no greater than approximately 90 microns, no greater than approximately 21 microns, no greater than approximately 7 microns, or no greater than approximately 0.7 microns.

Item 18. The roofing granule of Item 13, wherein the base particle has a D90 particle size of at least approximately 0.7 microns, at least approximately 1 micron, at least approximately 7 microns, or at least approximately 20 microns.

Item 19. The roofing granule of Item 13, wherein the base particle has a D90 particle size no greater than approximately 220 microns, no greater than approximately 110 microns, no greater than approximately 30 microns, or no greater than approximately 17 microns.

Item 20. The roofing granule of Item 13, wherein the base particle has a smaller amount of open porosity as compared to the material.

Item 21. The roofing granule of Item 13, wherein the material has a first open porosity, the base particle has a second open porosity, and the first open porosity is no greater than approximately 95%, no greater than approximately 90%, no greater than approximately 80%, no greater than approximately 70%, no greater than approximately 50%, or no greater than approximately 20% of the second open porosity.

Item 22. The roofing granule of Item 13, wherein the material has a different composition as compared to the base particle.

Item 23. The roofing granule of Item 13, wherein the material extends a distance from the exposed surface of the roofing granule towards a center of the roofing granule.

Item 24. The roofing granule of Item 13, wherein the distance extends partly, but not completely to a center of the roofing granule.

Item 25. The roofing granule of Item 24, wherein the material occupies at least approximately 10%, at least approximately 20%, at least approximately 30%, at least approximately 40%, at least approximately 50%, at least approximately 60%, at least approximately 70%, at least approximately 80%, or at least approximately 90% of a volume of the roofing granule.

Item 26. The roofing granule of Item 24, wherein the distance extends at least approximately 0.011 mm, at least approximately 0.05 mm, at least approximately 0.11 mm, at least approximately 0.5 mm, or at least approximately 1.1 mm of the distance from the exposed surface of the roofing granule.

Item 27. The roofing granule of Item 24, wherein the distance extends no greater than approximately 2 mm, no greater than approximately 1.4 mm, no greater than approximately 0.9 mm, or no greater than approximately 0.5 mm of the distance from the exposed surface of the roofing granule.

Item 28. The roofing granule of Item 13, wherein the base particle has an open porosity of at least approximately 3%, at least approximately 7%, at least approximately 10%, at least approximately 12%, at least approximately 17%, or at least approximately 25%.

Item 29. The roofing granule of Item 13, wherein the base particle has an open porosity no greater than approximately 30%, no greater than approximately 25%, no greater than approximately 15%, no greater than approximately 12%, no greater than approximately 10%, or no greater than approximately 8%.

Item 30. The roofing granule of Item 13, wherein the base particle has a pore size that is at least about 0.01 microns, at least about 0.1 microns, or at least about 0.5 microns; or no greater than about 100 microns, no greater than about 20 microns, or no greater than about 1 micron.

Item 31. The roofing granule of Item 13, wherein the base particle includes a metal oxide, a metal silicate, a metal hydroxide, or an aluminosilicate.

Item 32. The roofing granule of Item 13, wherein the base particle includes a mixed metal compound.

Item 33. The roofing granule of Item 1, wherein the first material includes a low density filler material or a void containing filler material.

Item 34. The roofing granule of Item 1, wherein a solubility of the metal carbonate in water at 20° C. is less than about 0.05, less than about 0.004, less than about 0.001, or less than about 0.0008 grams per 100 grams of water.

Item 35. A roofing product including a roofing substrate; a bituminous material; and roofing granules over the bituminous material and roofing substrate, wherein the roofing granules include the roofing granule of Item 1.

Item 36. A process of forming a roofing granule including providing a base particle having pores; infiltrating a fluid into the pores of the base particle, wherein the fluid includes a carbonate; and reacting the carbonate with a metal compound within the base particle to form a metal carbonate, wherein the roofing granule includes a material that includes the metal carbonate.

Item 37. The process of Item 36, wherein the material has a D10 particle size of at least approximately 0.001 microns, at least approximately 0.015 microns, at least approximately 0.11 microns, or at least approximately 1 micron.

Item 38. The process of Item 36, wherein the material has a D10 particle size no greater than approximately 30 microns, no greater than approximately 8 microns, no greater than approximately 0.2 microns, or no greater than approximately 0.01 microns.

Item 39. The process of Item 36, wherein the material has a D50 particle size of at least approximately 0.1 microns, at least approximately 0.8 microns, at least approximately 1.3 microns, or at least approximately 2 microns.

Item 40. The process of Item 36, wherein the material has a D50 particle size no greater than approximately 90 microns, no greater than approximately 21 microns, no greater than approximately 7 microns, or no greater than approximately 0.7 microns.

Item 41. The process of Item 36, wherein the material has a D90 particle size of at least approximately 0.7 microns, at least approximately 1 micron, at least approximately 7 microns, or at least approximately 20 microns.

Item 42. The process of Item 36, wherein the material has a D90 particle size no greater than approximately 220 microns, no greater than approximately 110 microns, no greater than approximately 30 microns, or no greater than approximately 17 microns.

Item 43. The process of Item 36, wherein the base particle has a pre-reaction open porosity before reacting, the material has a post-reaction open porosity after reacting, and the post-reaction open porosity is no greater than approximately 99%, no greater than approximately 95%, no greater than approximately 90%, no greater than approximately 80%, or no greater than approximately 70% of the pre-reaction open porosity.

Item 44. The process of Item 36, wherein the material has an open porosity of at least approximately 3%, at least approximately 7%, at least approximately 10%, at least approximately 12%, at least approximately 17%, or at least approximately 25%.

Item 45. The process of Item 36, wherein the material has an open porosity no greater than approximately 30%, no greater than approximately 23%, no greater than approximately 15%, no greater than approximately 12%, no greater than approximately 10%, or no greater than approximately 8%.

Item 46. The process of Item 36, wherein before reacting, the base particle has a pore size that is at least about 0.01 microns, at least approximately 0.1 microns, or at least approximately 0.5 microns; or no greater than approximately 100 microns, no greater than approximately 20 microns, or no greater than approximately 1 micron.

Item 47. The process of Item 36, wherein a solubility of the metal carbonate in water at 20° C. is less than about 0.05, less than about 0.004, less than about 0.001, or less than about 0.0008 grams per 100 grams of water.

Item 48. The process of Item 36, wherein the base particle includes a metal oxide, a metal silicate, a metal hydroxide, or an aluminosilicate.

Item 49. The process of Item 36, wherein the base particle includes a mixed metal compound.

Item 50. The process of Item 36, wherein the first material includes a low density filler material or a void containing filler material.

Item 51. The process of Item 36, wherein after reacting, the roofing granule further includes a remaining portion of the base particle, wherein at least a portion of the material is disposed between the remaining portion of the base particle and an exposed surface of the roofing granule.

Item 52. The process of Item 51, wherein the remaining portion of the base particle has a D10 particle size of at least approximately 0.001 microns, at least approximately 0.015 microns, at least approximately 0.11 microns, or at least approximately 1 micron.

Item 53. The process of Item 51, wherein the remaining portion of the base particle has a D10 particle size no greater than approximately 30 microns, no greater than approximately 8 microns, no greater than approximately 0.2 microns, or no greater than approximately 0.01 microns.

Item 54. The process of Item 51, wherein the remaining portion of the base particle has a D50 particle size of at least approximately 0.1 microns, at least approximately 0.8 microns, at least approximately 1.3 microns, or at least approximately 2 microns.

Item 55. The process of Item 51, wherein the remaining portion of the base particle has a D50 particle size no greater than approximately 90 microns, no greater than approximately 21 microns, no greater than approximately 7 microns, or no greater than approximately 0.7 microns.

Item 56. The process of Item 51, wherein the remaining portion of the base particle has a D90 particle size of at least approximately 0.7 microns, at least approximately 1 micron, at least approximately 7 microns, or at least approximately 20 microns.

Item 57. The process of Item 51, wherein the remaining portion of the base particle has a D90 particle size no greater than approximately 220 microns, no greater than approximately 110 microns, no greater than approximately 30 microns, or no greater than approximately 17 microns.

Item 58. The process of Item 51, wherein the material has a first open porosity, the remaining portion of the base particle has a second open porosity, and the first open porosity is no greater than approximately 95%, no greater than approximately 90%, no greater than approximately 80%, no greater than approximately 70%, no greater than approximately 50%, or no greater than approximately 20% of the second open porosity.

Item 59. The process of Item 36, wherein the material has a different composition as compared to the base particle.

Item 60. The process of Item 36, wherein before reacting, the roofing granule occupies a pre-reaction volume, after reacting, the roofing granule occupies a post reaction volume, and the post-reaction volume is within approximately 30%, within approximately 20%, within approximately 15%, within approximately 9%, within approximately 5%, or within approximately 2% of the pre-reaction volume.

Item 61. The process of Item 36, wherein the fluid includes a liquid.

Item 62. The process of Item 61, wherein liquid includes water.

Item 63. The process of Item 61, wherein liquid has substantially no water.

Item 64. The process of Item 61, wherein liquid includes ammonia or an organic compound.

Item 65. The process of Item 61, wherein the liquid has a pH greater than 7, 8, 9, 10, 11, or 12.

Item 66. The process of Item 61, wherein the liquid has a pH less than 7, 6, 5, or 4.

Item 67. The process of Item 61, wherein reacting is performed at a pressure higher than atmospheric pressure.

Item 68. The process of Item 61, wherein reacting is performed at a pressure of at least approximately 5 kPa, at least approximately 11 kPa, at least approximately 50 kPa, at least approximately 110 kPa, at least approximately 500 kPa, at least approximately 1.1 MPa, at least approximately 5 MPa, at least approximately 11 MPa, or at least approximately 50 MPa.

Item 69. The process of Item 61, wherein reacting is performed at a pressure no greater than approximately 900 MPa, no greater than approximately 500 MPa, no greater than least approximately 90 MPa, or no greater than approximately 50 MPa, no greater than approximately 900 kPa, no greater than approximately 500 kPa, no greater than approximately 90 kPa, or no greater than approximately 50 kPa.

Item 70. The process of Item 61, wherein reacting is performed at a temperature of at least approximately 20° C., at least approximately 50° C., at least approximately 80° C., at least approximately 110° C., at least approximately 150° C., at least approximately 200° C., at least approximately 250° C., or at least approximately 300° C.

Item 71. The process of Item 61, wherein reacting is performed at a temperature no greater than approximately 1000° C., no greater than approximately 500° C., no greater than approximately 300° C., no greater than approximately 250° C., no greater than approximately 190° C., no greater than approximately 150° C., no greater than approximately 130° C., no greater than approximately 100° C., or no greater than approximately 90° C.

Item 72. The process of Item 61, wherein reacting is performed for a time period of at least approximately 11 seconds, at least approximately 1.1 minutes, at least approximately 5 minutes, at least approximately 11 minutes, at least approximately 20 minutes, at least approximately 1 hour, at least approximately 11 hours, at least approximately 20 hours, at least approximately 50 hours.

Item 73. The process of Item 61, wherein reacting is performed for a time period no greater than approximately 200 hours, no greater than approximately 90 hours, no greater than approximately 24 hours, no greater than approximately 5 hours, no greater than approximately 3 hours, no greater than approximately 2 hours, no greater than approximately 0.9 hour, or no greater than approximately 0.5 hour.

Item 74. The process of Item 36, wherein reacting further produces an antimicrobial agent.

Item 75. The process of Item 36, wherein the antimicrobial agent includes a photocatalytic antimicrobial agent adjacent to an exposed surface of the roofing granule.

Item 76. The process of Item 36, wherein reacting further produces $Cu_2O$, $Ag_2O$, $SnO_2$, $ZnO$, $TiO_2$, or any combination thereof.

Item 77. The process of Item 36, wherein the material extends a distance from an exposed surface of the roofing granule towards a center of the roofing granule.

Item 78. The process of Item 36, wherein the material extends partly, but not completely to a center the roofing granule.

Item 79. The process of Item B43, wherein the material occupies at least approximately 10%, at least approximately 20%, at least approximately 30%, at least approximately 40%, at least approximately 50%, at least approximately 60%, at least approximately 70%, at least approximately 80%, or at least approximately 90% of a volume of the roofing granule.

Item 80. The process of Item B43, wherein the distance extends at least approximately 0.011 mm, at least approximately 0.05 mm, at least approximately 0.11 mm, at least approximately 0.5 mm, or at least approximately 1.1 mm of the distance from the exposed surface of the roofing granule.

Item 81. The process of Item B43, wherein the distance extends no greater than approximately 2 mm, no greater than approximately 1.4 mm, no greater than approximately 0.9 mm, or no greater than approximately 0.5 mm of the distance from the exposed surface of the roofing granule.

Item 82. The process of Item 36, wherein before reacting, the base particle has an open porosity of at least approximately 3%, at least approximately 7%, at least approximately 10%, at least approximately 12%, at least approximately 17%, or at least approximately 25%.

Item 83. The process of Item 36, wherein before reacting, the base particle has an open porosity no greater than approximately 30%, no greater than approximately 25%, no greater than approximately 15%, no greater than approximately 12%, no greater than approximately 10%, or no greater than approximately 8%.

Item 84. A process of forming a roofing product including providing a roofing substrate; coating the roofing substrate with a bituminous material; and applying roofing granules over the bituminous material and roofing substrate, wherein the roofing granules include the roofing granule formed by the process of Item 36.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A roofing granule comprising a material comprising a transition metal carbonate; a mixed metal carbonate, wherein at least one metal within the mixed metal carbonate includes a transition metal; a first metal carbonate and a second metal compound, wherein the first and second metals are different metal elements; a third metal carbonate and silica, wherein the roofing granule further comprises a base particle, wherein the roofing granule further comprises a remaining portion of the base particle having a first volume, at least a portion of the material is disposed between the remaining portion of the base particle and the exposed surface of the roofing granule at a distance of no greater than approximately 2 mm from the exposed surface towards a center of the roofing granule, the material having a second volume and the material and base particle include a same metal element and a ratio of the first volume and the second volume is at least 1.1:1, wherein the material occupies at least approximately 50% of the entire volume of the roofing granule.

2. The roofing granule of claim 1, wherein the material has a D10 particle size of at least approximately 0.001 microns, at least approximately 0.015 microns, at least approximately 0.11 microns, or at least approximately 1 micron.

3. The roofing granule of claim 1, the material has an open porosity of at least approximately 3%, at least approximately 7%, at least approximately 10%, at least approximately 12%, at least approximately 17%, or at least approximately 25%.

4. The roofing granule of claim 1, wherein the material further comprises an antimicrobial agent.

5. The roofing granule of claim 1, wherein the antimicrobial agent comprises a photocatalytic antimicrobial agent adjacent to the exposed surface of the material.

6. The roofing granule of claim 1, wherein the material further comprises $Cu_2O$, $Ag_2O$, $SnO_2$, $ZnO$, $TiO_2$, or any combination thereof.

7. The roofing granule of claim 1, wherein the base particle has a smaller amount of open porosity as compared to the material.

8. The roofing granule of claim 1, wherein the base particle comprises a metal oxide, a metal silicate, a metal hydroxide, or an aluminosilicate.

9. The roofing granule of claim 1, wherein a solubility of the metal carbonate in water at 20° C. is less than about 0.05, less than about 0.004, less than about 0.001, or less than about 0.0008 grams per 100 grams of water.

10. A roofing product comprising:
a roofing substrate;
a bituminous material; and
roofing granules over the bituminous material and roofing substrate, wherein the roofing granules include the roofing granule of claim 1.

* * * * *